(12) United States Patent
Toyota et al.

(10) Patent No.: US 10,370,036 B2
(45) Date of Patent: Aug. 6, 2019

(54) VEHICLE ROOF STRUCTURE

(71) Applicant: TOYOTA JIDOSHA KABUSHIKI KAISHA, Toyota-shi, Aichi-ken (JP)

(72) Inventors: Masaru Toyota, Toyota (JP); Tsuyoshi Izuhara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/677,351

(22) Filed: Aug. 15, 2017

(65) Prior Publication Data
US 2018/0099698 A1   Apr. 12, 2018

(30) Foreign Application Priority Data
Oct. 7, 2016   (JP) .................................. 2016-199436

(51) Int. Cl.
| | |
|---|---|
| B62D 21/15 | (2006.01) |
| B62D 25/06 | (2006.01) |
| B62D 25/02 | (2006.01) |
| B62D 29/00 | (2006.01) |
| B62D 27/02 | (2006.01) |

(52) U.S. Cl.
CPC ............ *B62D 21/157* (2013.01); *B62D 25/02* (2013.01); *B62D 25/06* (2013.01); *B62D 29/005* (2013.01); *B60Y 2304/03* (2013.01); *B60Y 2306/01* (2013.01); *B62D 27/023* (2013.01)

(58) Field of Classification Search
CPC ...... B62D 21/157; B62D 25/02; B62D 25/06; B62D 29/005

USPC ................................ 296/210, 193.06, 203.03
See application file for complete search history.

(56) References Cited

U.S. PATENT DOCUMENTS

| | | | |
|---|---|---|---|
| 8,210,602 B2* | 7/2012 | Kobayashi | B62D 25/06 296/187.12 |
| 9,394,018 B2* | 7/2016 | Kisaku | B62D 25/02 |
| 2004/0113465 A1 | 6/2004 | Wieschermann et al. | |

(Continued)

FOREIGN PATENT DOCUMENTS

| | | |
|---|---|---|
| DE | 102014214846 A1 | 2/2016 |
| JP | S61-117776 U | 7/1986 |

(Continued)

OTHER PUBLICATIONS

Oct. 2, 2018 Office Action issued in Japanese Patent Application No. 2016-199436.

*Primary Examiner* — Joseph D. Pape
(74) *Attorney, Agent, or Firm* — Oliff PLC

(57) ABSTRACT

The present disclosure provides a vehicle roof structure including: a left and right pair of roof side rails configuring part of a roof section of a vehicle body, the roof side rails are supported by a center pillar configuring part of the vehicle body and extend along a vehicle front-rear direction; a roof reinforcement portion formed of fiber reinforced plastic, the roof reinforcement portion disposed between the roof side rails so as to extend along a vehicle width direction; and a coupling section formed of metal, the coupling section couples the roof side rails and the roof reinforcement portion, and includes a weak section, the weak section deforms under a collision load in the vehicle width direction prior to the roof reinforcement portion undergoing bending deformation under the collision load.

4 Claims, 7 Drawing Sheets

(56) References Cited

U.S. PATENT DOCUMENTS

| | | | |
|---|---|---|---|
| 2008/0122259 A1* | 5/2008 | Matsui | B62D 21/157 296/187.12 |
| 2009/0174228 A1* | 7/2009 | Duguet | B62D 25/04 296/214 |
| 2012/0242112 A1 | 9/2012 | Yamamoto | |
| 2014/0159425 A1 | 6/2014 | Kim et al. | |
| 2016/0101672 A1* | 4/2016 | Oshima | B60J 7/043 296/216.04 |
| 2016/0297479 A1 | 10/2016 | Ritschel et al. | |
| 2017/0080985 A1 | 3/2017 | Wilhelm et al. | |

FOREIGN PATENT DOCUMENTS

| | | |
|---|---|---|
| JP | H04-132876 U | 12/1992 |
| JP | 2013-028216 A | 2/2013 |
| JP | 2013-144496 A | 7/2013 |
| JP | 2014-091462 A | 5/2014 |
| JP | 2014-141220 A | 8/2014 |
| JP | 2015-033956 A | 2/2015 |
| WO | 2010/146690 A1 | 12/2010 |
| WO | 2015/091240 A1 | 6/2015 |

\* cited by examiner

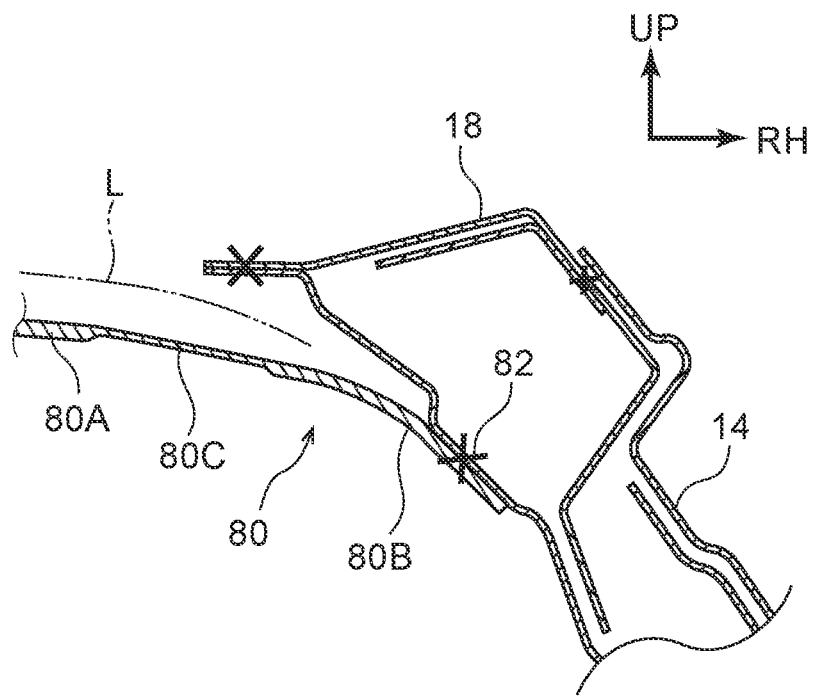
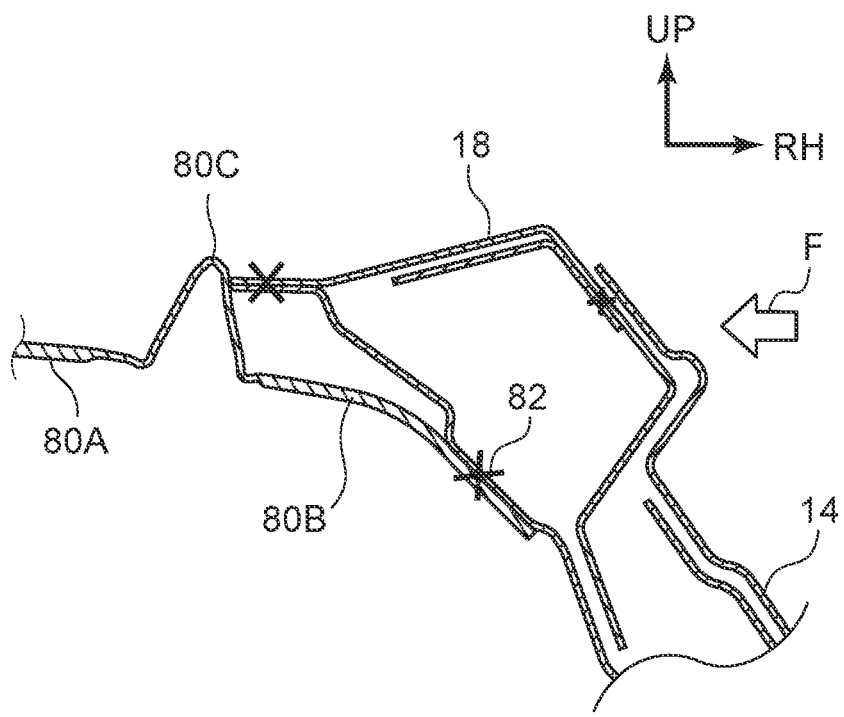

VEHICLE ROOF STRUCTURE

CROSS-REFERENCE TO RELATED APPLICATION

This application claims priority under 35 USC 119 from Japanese Patent Application No. 2016-199436, filed on Oct. 7, 2016, the disclosure of which is incorporated by reference herein.

BACKGROUND

Technical Field

The present disclosure relates to a vehicle roof structure.

Related Art

Japanese Patent Application Laid-Open (JP-A) No. 2014-091462 discloses a vehicle body structure of an automobile. In this automobile vehicle body structure, a left and right pair of roof side rails that configure part of a roof section of a vehicle body are coupled to a roof arch (a reinforcement portion) extending along a vehicle width direction. Upper end portions of vehicle body center pillars are also coupled together by the roof arch. Thus, in JP-A 2014-091462, collision load at the time of a collision from the side (hereafter, referred to as "side collision") of the vehicle can be sustained by the roof arch. Moreover, since the roof arch is configured from carbon fiber reinforced plastic (referred to as CFRP below), the weight of the vehicle body may also be reduced.

However, in the above case, in a case in which collision load in side collision of the vehicle were to be transmitted to the roof arch without being absorbed by portions other than the roof arch, it is conceivable that the roof arch would break at an initial stage of the side collision, thus making sufficient absorption of the collision load difficult. Namely, in the above case, there is room for improvement from the perspective of achieving both weight reduction of the vehicle body and securing the absorption efficiency of collision load in a side collision of the vehicle.

SUMMARY

The present disclosure provides a vehicle roof structure that may reduce the weight of a vehicle body and may secure the absorption efficiency of collision load in a side collision of a vehicle.

A first aspect of the present disclosure is a vehicle roof structure including: a left and right pair of roof side rails configuring part of a roof section of a vehicle body, the roof side rails are supported by a center pillar configuring part of the vehicle body and extend along a vehicle front-rear direction; a roof reinforcement portion formed of fiber reinforced plastic, the roof reinforcement portion disposed between the roof side rails so as to extend along a vehicle width direction; and a coupling section formed of metal, the coupling section couples the roof side rails and the roof reinforcement portion, and includes a weak section, the weak section deforms under a collision load in the vehicle width direction prior to the roof reinforcement portion undergoing bending deformation under the collision load.

According to the first aspect of the present disclosure, the left and right pair of roof side rails configuring part of the roof section of a vehicle body and extending along the vehicle front-rear direction are supported by a center pillar configuring part of the vehicle body. The roof reinforcement portion extending along the vehicle width direction is disposed between the roof side rails. In a side collision of the vehicle, a collision load transmitted through the center pillar and the roof side rails may be sustained by the roof reinforcement portion. The roof reinforcement portion is also formed of fiber reinforced plastic, enabling a weight reduction in the roof section, and hence in the vehicle body, to be achieved.

However, since the roof reinforcement portion described above is formed of fiber reinforced plastic, in a case in which a collision load in a side collision of the vehicle were to be transmitted to the roof reinforcement portion without being absorbed by portions other than the roof reinforcement portion, the roof reinforcement portion may break at an initial stage of the side collision.

In the present disclosure, the coupling section formed of metal is included, and the roof side rails and the roof reinforcement portion are coupled together by the coupling section. The coupling section is also provided with the weak section. The weak section deforms under a collision load in the vehicle width direction prior to the roof reinforcement portion undergoing bending deformation under the collision load. Note that herein, bending deformation also includes buckling deformation. Accordingly, collision load in a side collision of the vehicle is absorbed by the weak section at an initial stage of the side collision, after which the collision load is transmitted to the roof reinforcement portion and absorbed by the roof reinforcement portion.

In a second aspect of the present disclosure, in the above first aspect, the weak section may be formed with a protruding bead portion, the protruding bead portion may extend along the vehicle front-rear direction and may protrude toward a neutral axis side of vehicle vertical direction bending in the coupling section due to the collision load.

According to the second aspect of the present disclosure, the protruding bead portion that extends along the vehicle front-rear direction is formed at the weak section provided to the coupling section. The protruding bead protrudes toward the neutral axis side of vehicle vertical direction bending in the coupling section due to a collision load in the vehicle width direction. Accordingly, at the location where the protruding bead portion is provided to the weak section, the second moment of area of the cross-section of the weak section with respect to the neutral axis is smaller than at other locations of the weak section, enabling the protruding bead portion to be the origin of deformation.

In a third aspect of the present disclosure, in the above second aspect, the weak section may include, the protruding bead portion formed further toward a vehicle width direction outer side than an inner side connection portion that connects the coupling section and the roof reinforcement portion, and an indented bead portion indented to an opposite side to the neutral axis and extending along the vehicle front-rear direction, the indented bead portion is formed further toward a vehicle width direction inner side than an outer side connection portion that connects the coupling section and the roof side rails and further toward the vehicle width direction outer side than the protruding bead portion; and the outer side connection portion may be provided at a portion to a vehicle lower side of the roof side rails, and the protruding bead portion and the indented bead portion may be disposed further toward a vehicle upper side than the outer side connection portion and further toward the vehicle lower side than an apex of the roof side rails.

According to the third aspect of the present disclosure, the protruding bead portion is formed at the weak section. The protruding bead portion is positioned further toward the vehicle width direction outer side than the inner side connection portion connecting the coupling section and the roof reinforcement portion. The indented bead portion that is indented to the opposite side to the neutral axis and that extends along the vehicle front-rear direction is also formed at the weak section. The indented bead portion is positioned further toward the vehicle width direction inner side than the outer side connection portion connecting the coupling section and the roof side rails.

Thus, in a case in which the coupling section receives a collision load in the vehicle width direction, the portion of the weak section around the protruding bead portion deforms so as to form a protrusion on the neutral axis side, with the protruding bead portion acting as the origin of deformation. In contrast thereto, the location of the weak section where the indented bead portion is provided is less liable to undergo bending deformation, since the second moment of area of the cross-section of the weak section with respect to the neutral axis is greater than at other locations of the weak section. As a result, as the deformation process of the weak section progresses, the portion between the protruding bead portion and the indented bead portion deforms so as to pivot about the indented bead portion toward the vehicle vertical direction.

Moreover, the outer side connection portion is provided at the portion to the vehicle lower side of the roof side rails, and the protruding bead portion and the indented bead portion are disposed further toward the vehicle upper side than the outer side connection portion and further toward the vehicle lower side than the apex of the roof side rails. Accordingly, the portion of the weak section between the protruding bead portion and the indented bead portion deforms so as to pivot toward the vehicle upper side. After the weak section has deformed, the collision load is transmitted from the roof side rails to the roof reinforcement portion through the portion of the coupling section further toward the vehicle width direction inner side than the protruding bead portion. As a result, the load placed on the outer side connection portion due to the collision load F may be suppressed.

In a fourth aspect of the present disclosure, in the above second aspect, the weak section may include, a first indented bead portion indented toward an opposite side to the neutral axis and extending along the vehicle front-rear direction, the first indented bead portion formed further toward a vehicle width direction outer side than an inner side connection portion that connects the coupling section and the roof reinforcement portion, a second indented bead portion indented to the opposite side to the neutral axis and extending along the vehicle front-rear direction, the second indented bead portion formed further toward a vehicle width direction inner side than an outer side connection portion that connects the coupling section and the roof side rails, and the protruding bead portion formed between the first indented bead portion and the second indented bead portion; and the outer side connection portion may be provided at a portion at a vehicle lower side of the roof side rails, and the protruding bead portion, the first indented bead portion, and the second indented bead portion may be disposed further toward a vehicle upper side than the outer side connection portion and further toward the vehicle lower side than an apex of the roof side rails.

According to the fourth aspect, the first indented bead portion, the second indented bead portion, and the protruding bead portion are formed at the weak section. The first indented bead portion is positioned further to the vehicle width direction outer side than the inner side connection portion connecting the coupling section and the roof reinforcement portion. The first indented bead portion is indented to the opposite side to the neutral axis and extends along the vehicle front-rear direction. The second indented bead portion is configured similarly to the first indented bead portion, and is positioned further toward the vehicle width direction inner side than the outer side connection portion connecting the coupling section and the roof side rails. The protruding bead portion is formed between the first indented bead portion and the second indented bead portion.

Thus, in a case in which the coupling section receives a collision load in the vehicle width direction, the portion of the weak section around the protruding bead portion deforms so as to form a protrusion on the neutral axis side, with the protruding bead portion acting as the origin of deformation. In contrast thereto, the locations of the weak section where the first indented bead portion and the second indented bead portion are provided are less liable to undergo bending deformation, since at these locations, the second moment of area of the cross-section of the weak section with respect to the neutral axis is greater than at other locations of the weak section. Moreover, the outer side connection portion is provided to the portion at the vehicle lower side of the roof side rails, and the protruding bead portion, the first indented bead portion, and the second indented bead portion are disposed further toward the vehicle upper side than the outer side connection portion and further toward the vehicle lower side than the apex of the roof side rails. Thus, as the deformation process of the weak section progresses, the portion between the first indented bead portion and the second indented bead portion deforms so as to protrude and kink toward the vehicle upper side.

In a fifth aspect of the present disclosure, in the above first aspect, the weak section may be provided between an inner side connection portion, configuring a part of the coupling section and is connected to the roof reinforcement portion, and an outer side connection portion, configuring a part of the coupling section and is connected to the roof side rails, and the weak section may be configured by a thinned portion formed thinner than the inner side connection portion and the outer side connection portion.

According to the fifth aspect, the weak section is disposed between the inner side connection portion configuring part of the coupling section and connected to the roof reinforcement portion and the outer side connection portion configuring part of the coupling section and connected to the roof side rails. The weak section is configured by a thinned portion that is formed thinner than the inner side connection portion and the outer side connection portion. Thus, in a case in which a collision load in the vehicle width direction is input, the thinned portion undergoes bending deformation, thereby absorbing the collision load. Accordingly, the fifth aspect may simplify the configuration of the weak section, compared to cases in which a bead portion or the like is provided to the coupling section so as to set the weak section.

A sixth aspect of the present disclosure, in the above aspects, may further include a high rigidity portion provided to the coupling section and between the roof reinforcement portion and the weak section, the high rigidity portion may be set with a higher rigidity with respect to bending in a vehicle vertical direction than a rigidity of the roof reinforcement portion.

According to the sixth aspect, the high rigidity portion is provided between the roof reinforcement portion and the weak section in the coupling section. The high rigidity portion is set with a higher rigidity with respect to bending in the vehicle vertical direction than the rigidity of the roof reinforcement portion. Thus, the sixth aspect may increase the certainty that the weak section will deform before the roof reinforcement portion due to the bending moment resulting from a collision load in the vehicle width direction.

As explained above, the vehicle roof structure according to the first aspect may reduce the weight of the vehicle body and may secure the absorption efficiency of collision load in a side collision of the vehicle.

The vehicle roof structure according to the second aspect may set, at a freely selected position, the origin of deformation for a case in which the coupling section that couples the roof reinforcement portion and the roof side rails together deforms under a collision load in a side collision of the vehicle.

The vehicle roof structure according to the third aspect may, even in a state in which a collision load has been input during a side collision of the vehicle, maintain the coupled state between the roof reinforcement portion and the roof side rails, and may enable the collision load to be stably absorbed.

The vehicle roof structure according to the fourth aspect may increase the deformation amount of the weak section, and may raise the absorption efficiency of collision load in a side collision of the vehicle.

The vehicle roof structure according to the fifth aspect may simplify the configuration of the coupling section while securing the absorption efficiency of collision load in a side collision of the vehicle.

The vehicle roof structure according to the sixth aspect may suppress the transmission of collision load in a side collision of the vehicle to the roof reinforcement portion at an initial stage of the side collision.

BRIEF DESCRIPTION OF THE DRAWINGS

Exemplary embodiments will be described in detail based on the following figures, wherein:

FIG. 7A is a cross-sectional view illustrating a vehicle roof structure according to a third exemplary embodiment in a state prior to a side collision of the vehicle, as viewed along a vehicle front-rear direction; and FIG. 7B is a cross-sectional view illustrating a vehicle roof structure according to the third exemplary embodiment in a state during a side collision of the vehicle, as viewed along a vehicle front-rear direction.

DETAILED DESCRIPTION

First Exemplary Embodiment

Explanation follows regarding a first exemplary embodiment of a vehicle roof structure according to the present disclosure, with reference to FIG. 1 to FIG. 5. Note that in each of the drawings, the arrow FR indicates the vehicle front side, the arrow UP indicates the vehicle upper side, and the arrow RH indicates the vehicle width direction right side, as appropriate.

Figure 5:
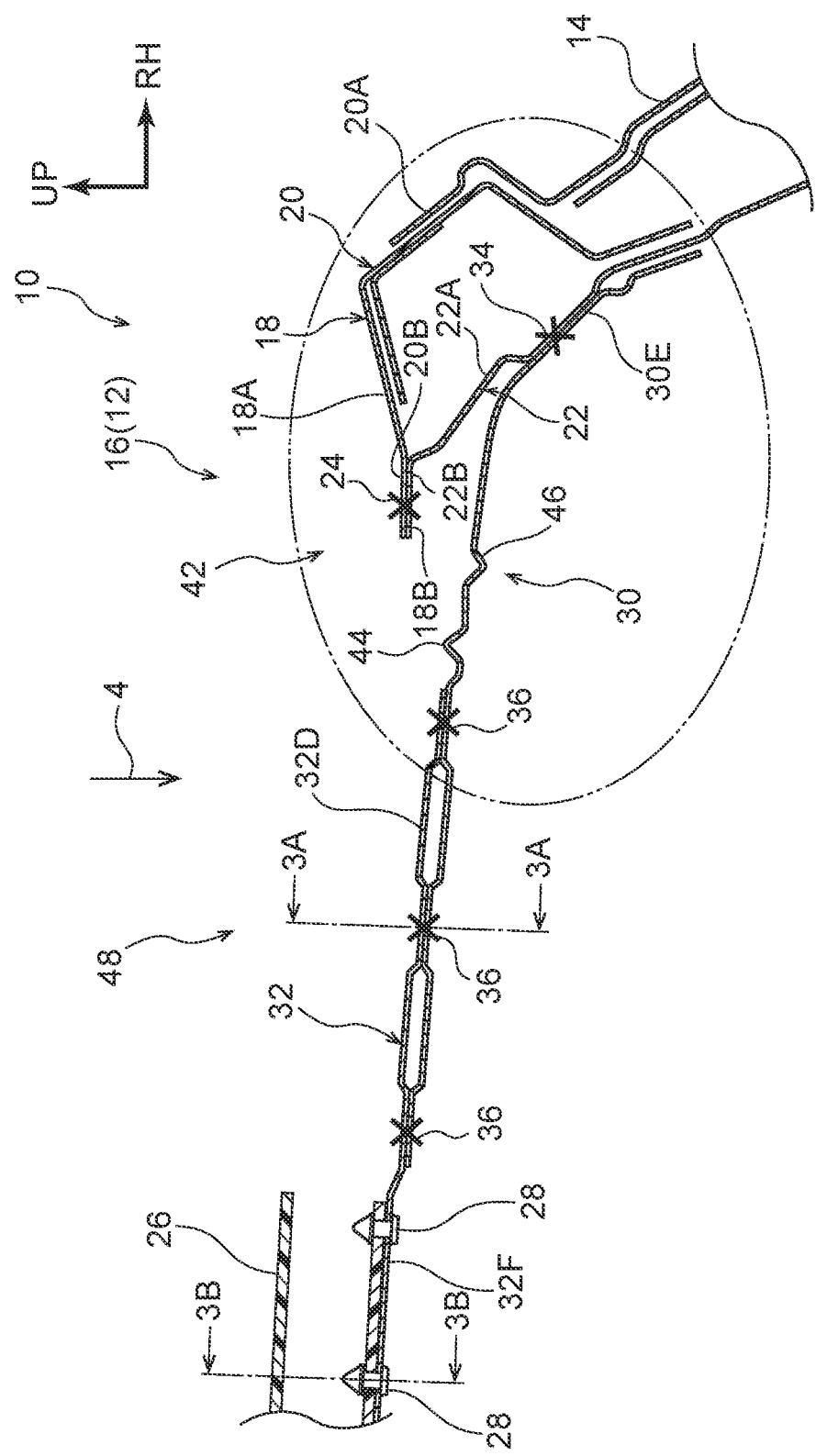
FIG. 5 is a cross-sectional view (a cross-section illustrating a state sectioned along line 5-5 in FIG. 4) illustrating configuration of a vehicle roof structure according to the first exemplary embodiment.

First, explanation is given regarding the schematic configuration of a portion mainly at a vehicle upper side of a vehicle body 12 of a vehicle 10 to which the vehicle roof structure according to the present exemplary embodiment has been applied, with reference to FIG. 5. Note that, in the present exemplary embodiment, the vehicle body 12 is basically configured with left-right symmetry, and so explanation will focus on the configuration of a portion on the vehicle width direction right side of the vehicle body 12.

In sequence from a vehicle front side, a left and right pair of front pillars (non-illustrated in the drawings), a left and right pair of center pillars 14, and a left and right pair of rear pillars are disposed at vehicle width direction outer sides of the vehicle body 12. A left and right pair of roof side rails 18 that configure part of a roof section 16 of the vehicle body 12 are supported by respective upper end portions of the front pillars, the center pillars 14, and the rear pillars.

Each roof side rail 18 extends along the vehicle front-rear direction, and is configured including an outer panel 20 that configures a portion on the vehicle width direction outer side of the roof side rail 18, and an inner panel 22 that configures a portion on a vehicle width direction inner side of the roof side rail 18. The outer panel 20 and the inner panel 22 of each roof side rail 18 are joined together at a join portion 24 using spot welding or the like so as to configure a closed cross-section structure, the profile of which has a closed cross-section, as viewed along the vehicle front-rear direction.

The outer panel 20 is provided with a flange portion 20B that extends out toward the vehicle width direction inner side from a main body portion 20A configuring the closed cross-section. The inner panel 22 is provided with a flange portion 22B that extends out toward the vehicle width direction inner side from a main body portion 22A configuring the closed cross-section. The flange portion 20B and the flange portion 22B are joined together at the join portion 24 so as to provide each roof side rail 18 with an extension portion 18B that extends out toward the vehicle width direction inner side from a closed cross-section configuration portion 18A. Note that a roof panel (non-illustrated in the drawings) that configures the roof side panel roof side rail 18 and the roof section 16 is disposed at the vehicle upper side of the roof side rail 18.

A roof reinforcement portion 26 that has an angular tube shape extending in the vehicle width direction and that reinforces the roof section 16 is disposed between the roof side rails 18. The roof reinforcement portion 26 is formed of CFRP. As illustrated in FIG. 3B, the roof reinforcement portion 26 has a rectangular shape in which the cross-section profile, as viewed along the length direction of a main body portion 26A of the roof reinforcement portion 26 (the vehicle width direction), is divided into two in the width direction of the roof reinforcement portion 26 (the vehicle front-rear direction). The roof reinforcement portion 26 is coupled to each roof side rail 18 through a first coupling member 30 and a second coupling member 32. The first coupling member 30 and the second coupling member 32 serve as a coupling section and are disposed in this sequence from the vehicle width direction outer side. Note that, the main body portion 26A and attachment pieces 26B that extend out along the vehicle front-rear direction from a vehicle upper side of the main body portion 26A, are fastened to the second coupling member 32 by fastening members such as rivets 28, as described below, to fix the roof reinforcement portion 26.

Figure 3A:
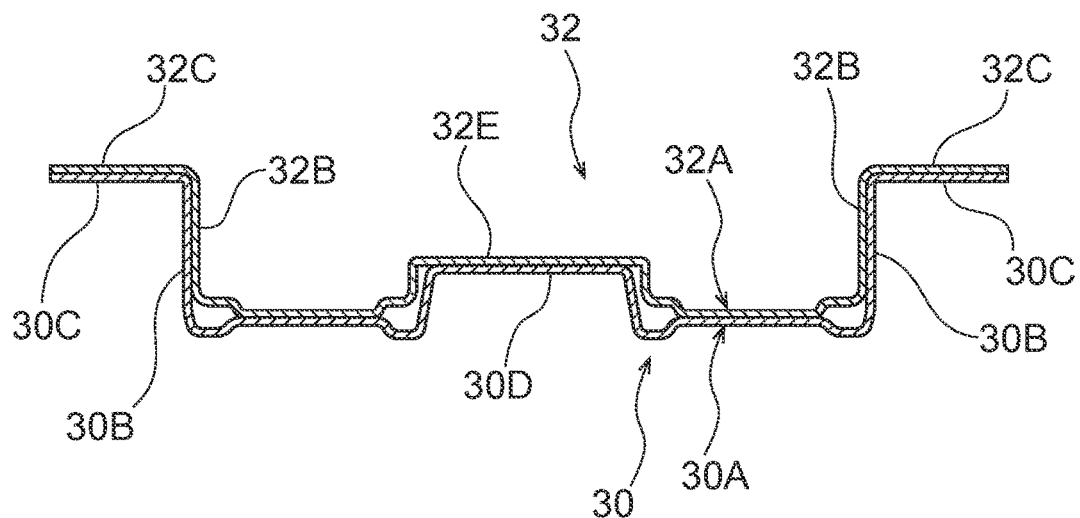
FIG. 3A is a cross-sectional view (a cross-section illustrating a state sectioned along line 3A-3A in FIG. 5) of a connection portion between a first coupling member and a second coupling member of a vehicle roof structure according to the first exemplary embodiment, as viewed along a vehicle width direction.
Figure 3B:
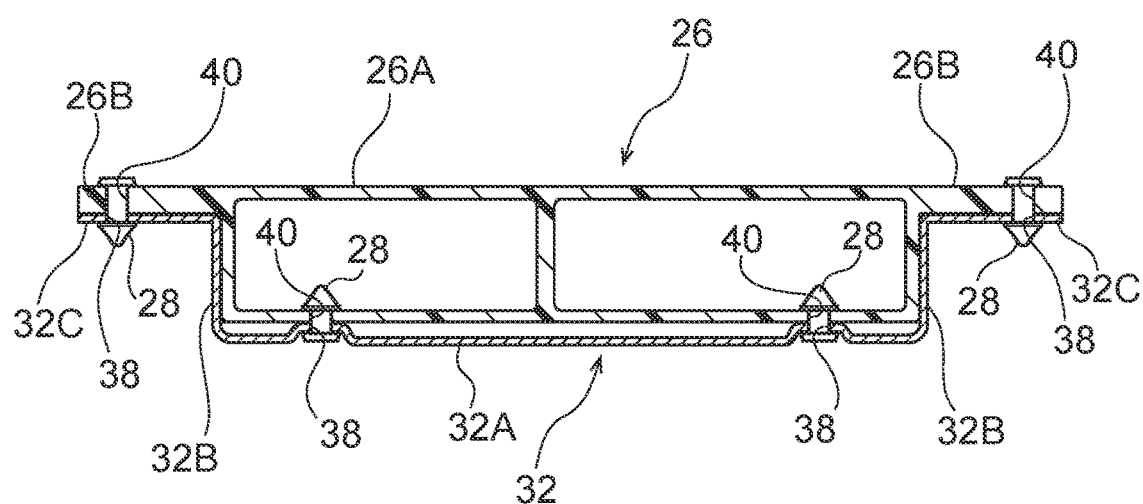
FIG. 3B is a cross-sectional view (a cross-section illustrating a state sectioned along line 3B-3B in FIG. 5) of a connection portion between a second coupling member and a roof reinforcement portion of a vehicle roof structure according to the first exemplary embodiment, as viewed along a vehicle width direction.
Figure 4:
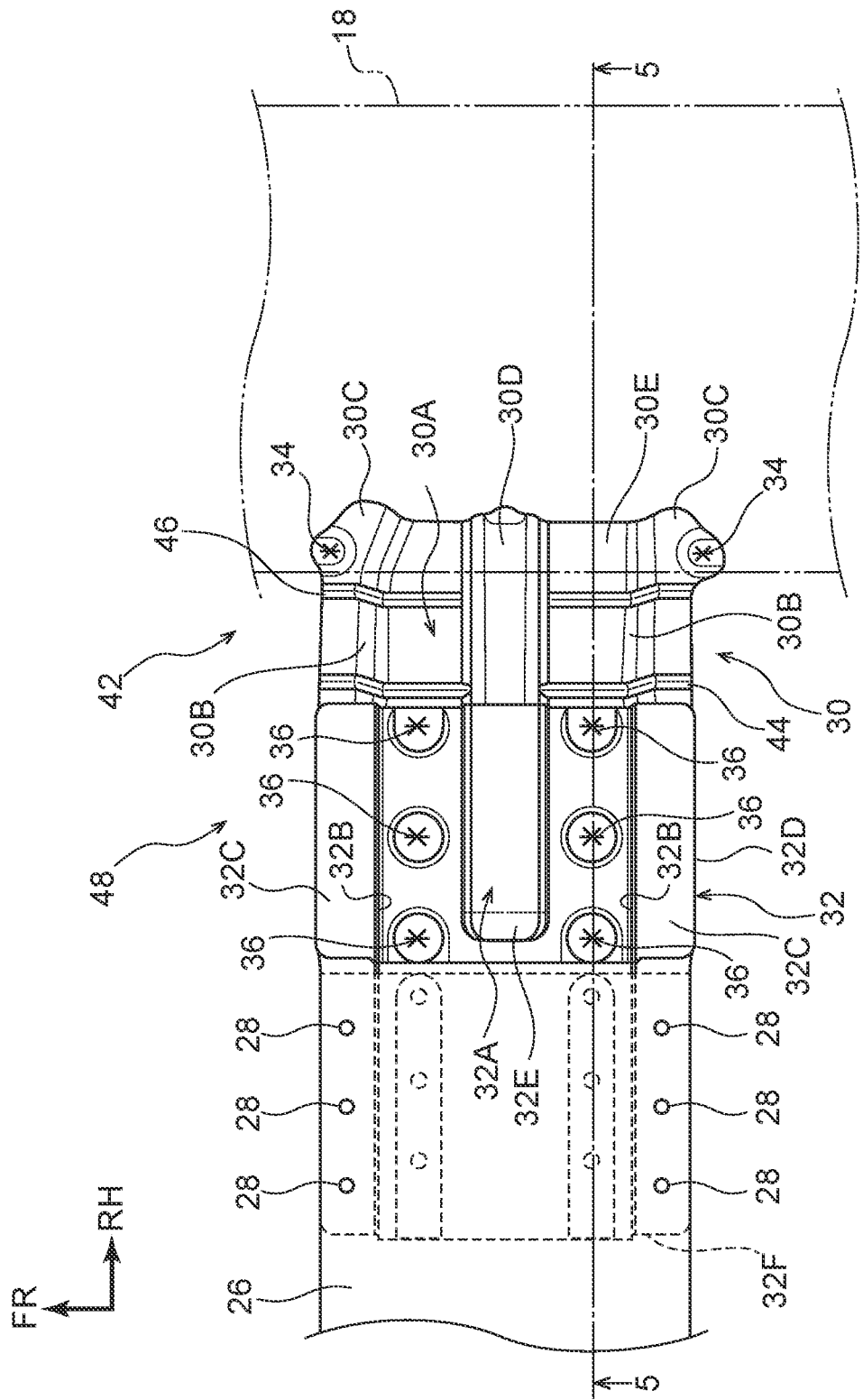
FIG. 4 is a plan view (viewed along the direction of arrow 4 in FIG. 5) illustrating configuration of a vehicle roof structure according to the first exemplary embodiment.

The first coupling member 30 is formed of steel, and as illustrated in FIG. 3A, FIG. 3B, and FIG. 4, is disposed with its length direction in the vehicle width direction, and overall is formed in a hat shape in which the cross-section profile, as viewed along the vehicle width direction (its length direction), is open toward the vehicle upper side. Specifically, the first coupling member 30 is configured including a lower wall portion 30A that configures a vehicle lower side of the first coupling member 30, a pair of side wall portions 30B that configure both vehicle front-rear direction sides of the first coupling member 30, and a pair of extending walls 30C that extend out from the side wall portions 30B.

The lower wall portion 30A has a plate shape with its thickness direction in the vehicle vertical direction, and a bulge portion 30D that extends along the vehicle width direction and bulges toward the vehicle upper side is formed at a vehicle front-rear direction central portion of the lower wall portion 30A. The side wall portions 30B are formed in plate shapes that respectively extend out toward the vehicle upper side from peripheral edge portions of the lower wall portion 30A that extend along the vehicle width direction, and that have their thickness direction in the vehicle front-rear direction. The extending walls 30C are formed in plate shapes that respectively extend out from peripheral edge portions on the vehicle upper side of the respective side wall portions 30B toward opposite sides to that of the bulge portion 30D, and that have their thickness direction in the vehicle vertical direction.

A portion on the vehicle width direction outer side of the first coupling member 30 configures an outer side connection portion 30E connected to the roof side rail 18. At the outer side connection portion 30E, the vehicle vertical direction height of the side wall portions 30B narrows on progression toward the vehicle width direction outer side. A portion of each of the extending walls 30C configuring the outer side connection portion 30E is joined to the roof side rail 18 at joining portions 34 using spot welding or the like to fix the first coupling member 30. Note that, as also illustrated in FIG. 5, the outer side connection portion 30E is joined to the roof side rail 18 at a vehicle lower side portion of the inner panel 22 of the roof side rail 18, and more specifically, at a portion further toward the vehicle lower side than a center of a cross-section of the roof side rail 18 taken along the vehicle vertical direction at a location where the joining portions 34 are provided to the roof side rail 18.

As illustrated in FIG. 3A, FIG. 3B, and FIG. 4, the second coupling member 32 is basically configured the same as the first coupling member 30. The second coupling member 32 is configured including a lower wall portion 32A, side wall portions 32B, and extending walls 32C. As also illustrated in FIG. 5, a portion to the vehicle width direction outer side of a length direction central portion of the second coupling member 32 (referred to below as outer side portion 32D) overlaps with a vehicle upper side of the first coupling member 30 and is joined to the first coupling member 30 using spot welding or the like at plural joining portions 36 provided along the length direction of the second coupling member 32. Note that a bulge portion 32E corresponding to the bulge portion 30D of the first coupling member 30 is formed at the outer side portion 32D of the second coupling member 32.

The roof reinforcement portion 26 is disposed at the upper side of a portion to the vehicle width direction inner side of a length direction central portion of the second coupling member 32 (referred to below as an inner side portion 32F), in a state overlapping therewith. Plural penetrating portions 38 are formed in the inner side portion 32F of the second coupling member 32 along the length direction thereof, and penetrating portions 40 corresponding to the penetrating portions 38 are formed in the roof reinforcement portion 26. In a state in which the penetrating portions 38 and the penetrating portions 40 are aligned in position, the penetrating portions 38, 40 are fastened together by rivets 28 to attach the roof reinforcement portion 26 to the second coupling member 32. Namely, the inner side portion 32F functions as an inner side connection portion that couples the second coupling member 32 and the roof reinforcement portion 26 together.

Figure 1:
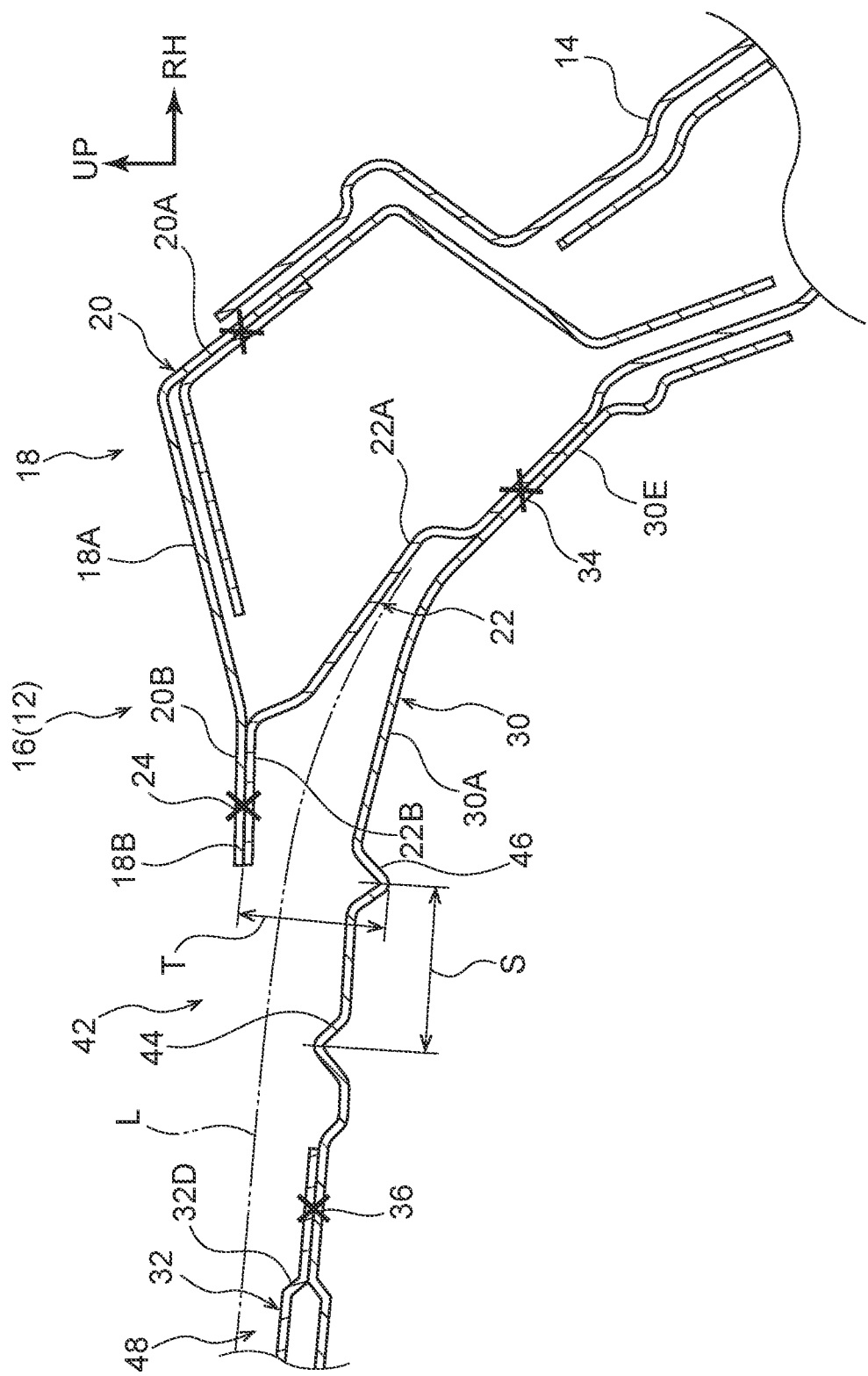
FIG. 1 is an enlarged cross-sectional view (an enlargement of the portion encircled by the double-dotted dashed line in FIG. 5) illustrating configuration of a vehicle roof structure according to a first exemplary embodiment.

In the present exemplary embodiment, as illustrated in FIG. 1 and FIG. 4, a weak section 42 is set in the first coupling member 30. A feature of the present exemplary embodiment is that a bead portion 44 serving as a protruding bead portion and a bead portion 46 serving as an indented bead portion are formed at the weak section 42. In the following, detailed explanation will be given regarding configuration of the weak section 42, and in particular, regarding the bead portions 44, 46, which configure relevant portions of the present exemplary embodiment, The bead portion 44 is formed spanning across each of the lower wall portion 30A, the side wall portions 30B, and the extending walls 30C of the first coupling member 30, and is divided in two at the bulge portion 30D formed in the lower wall portion 30A. The bead portion 44 is disposed so as to run along a peripheral edge portion at the vehicle width direction outer side of the second coupling member 32. In other words, the bead portion 44 is formed so as to extend along the vehicle front-rear direction.

The bead portion 44 is bulged so as to form a protrusion on a neutral axis L side of vehicle vertical direction bending of the first coupling member 30 due to a collision load F from the vehicle width direction outer side. In other words, the bead portion 44 is formed so as to form a protrusion that protrudes toward the center of a cross-section of the first coupling member 30, as viewed along the vehicle width direction, the center being in both the vehicle front-rear direction and the vehicle vertical direction.

Thus, as a result of forming the bead portion 44, at the location where the bead portion 44 is provided to the first coupling member 30, the second moment of area of the cross-section of the first coupling member 30 with respect to a neutral axis L can be made smaller than at other locations of the first coupling member 30. The rigidity of the roof reinforcement portion 26 with respect to bending in the vehicle vertical direction is also set so as to be larger than the rigidity with respect to bending at locations of the first coupling member 30 where the bead portion 44 is formed.

Similarly to the bead portion 44, the bead portion 46 is formed spanning across each of the lower wall portion 30A, the side wall portions 30B, and the extending walls 30C of the first coupling member 30, and is divided in two at the bulge portion 30D formed in the lower wall portion 30A. The bead portion 46 is disposed so as to run along a peripheral edge portion, or overlap with the peripheral edge portion, at the vehicle width direction inner side of the extension portion 18B of the roof side rail 18, as viewed from the vehicle upper side. In other words, the bead portion 46 is formed so as to extend along the vehicle front-rear direction.

Further, the bead portion 46 is bulged so as to form a protrusion on an opposite side to the neutral axis L of the first coupling member 30 due to a collision load F. The bead portion 46 can thus be understood as being formed so as to protrude toward an opposite side to the vehicle front-rear direction and vehicle vertical direction center of a cross-section of the first coupling member 30, as viewed along the vehicle width direction. The bead portion 46 can also be understood as being formed indented to an opposite side to the neutral axis L. Thus, by forming the bead portion 46, at the location where the bead portion 46 is provided to the first coupling member 30, the second moment of area of the cross-section of the first coupling member 30 with respect to the neutral axis L can be made greater than at other locations of the first coupling member 30. By providing the bead portions 44, 46 as described above, in a case in which a collision load F is input, a portion of the first coupling member 30 around the bead portions 44, 46 deforms before the roof reinforcement portion 26 undergoes bending deformation. In the present exemplary embodiment, this portion is set with the weak section 42.

Figure 2:
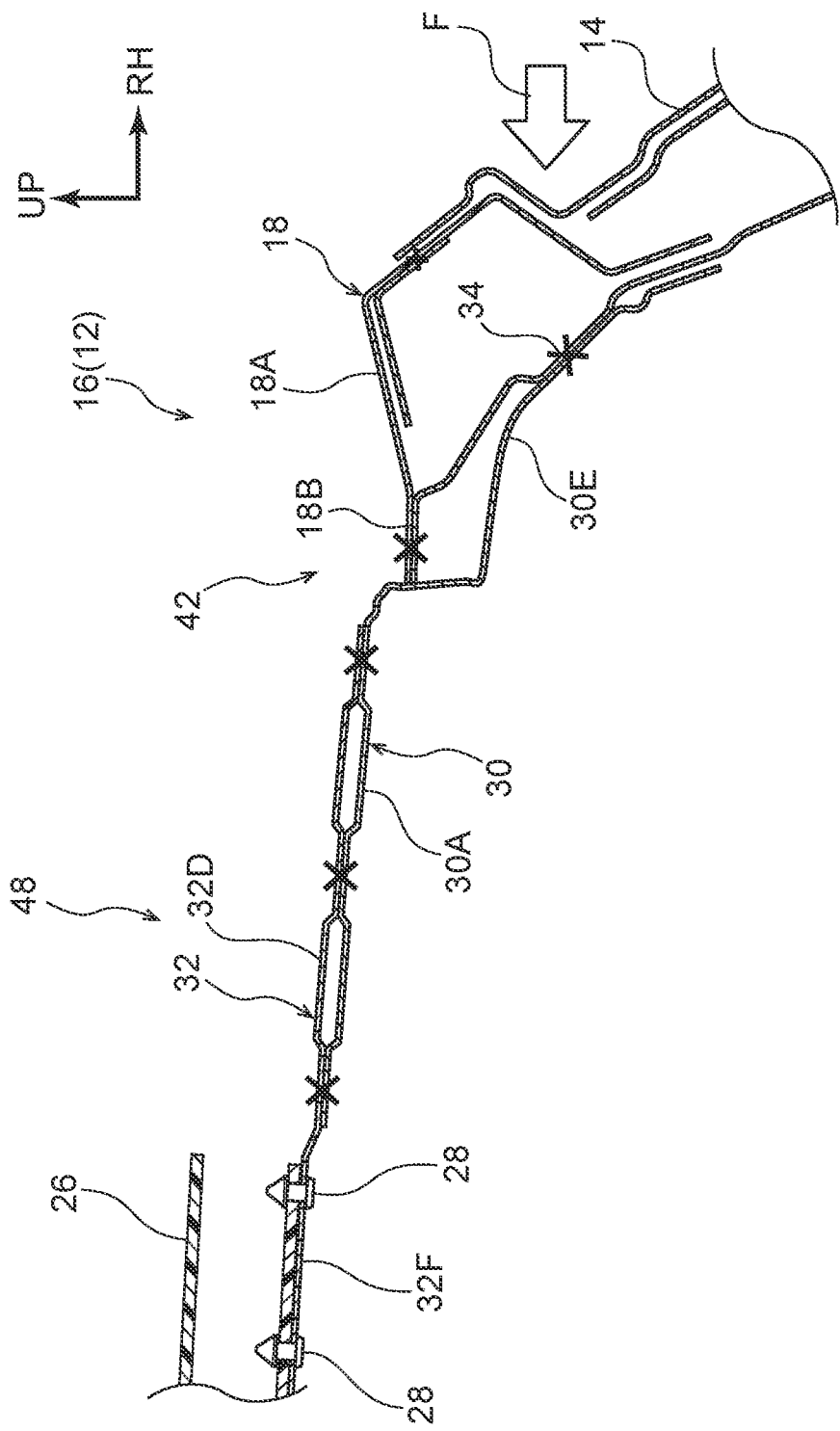
FIG. 2 is a cross-sectional view (a cross-section corresponding to FIG. 5) illustrating a vehicle roof structure according to the first exemplary embodiment in a state during a side collision of the vehicle, as viewed along a vehicle front-rear direction.

Note that the bead portions 44, 46 are positioned further toward the vehicle lower side than an apex (a vehicle upper side end portion) of the roof side rail 18. A distance S between an apex of the bead portions 44 and an apex of the 46 is also set as the same dimension, or slightly longer than, a distance T between the apex of the bead portion 46 and a leading end of the extension portion 18B of the roof side rail 18. As also illustrated in FIG. 2, at a portion between the roof reinforcement portion 26 and the weak section 42 where the first coupling member 30 and the second coupling member 32 overlap in the vehicle vertical direction, rigidity with respect to bending in the vehicle vertical direction is set to be larger than the rigidity of the roof reinforcement portion 26. Namely, in the present exemplary embodiment, the portion where the first coupling member 30 and the second coupling member 32 overlap in the vehicle vertical direction functions as a high rigidity portion 48.

Explanation follows regarding the function of the present exemplary embodiment.

In the present exemplary embodiment, as illustrated in FIG. 5, the left and right pair of roof side rails 18 that configure part of the roof section 16 of the vehicle body 12 and that extend along the vehicle front-rear direction are supported by the center pillars 14 configuring part of the vehicle body 12. The roof reinforcement portion 26 extending in the vehicle width direction is disposed between the roof side rails 18. In a side collision of the vehicle 10, a collision load F transmitted through the center pillars 14 and the roof side rails 18 can be sustained by the roof reinforcement portion 26. The roof reinforcement portion 26 is also formed of CFRP. Accordingly, the present exemplary embodiment may enable a weight reduction in the roof section 16, and hence in the vehicle body 12.

However, in a case in which the roof reinforcement portion 26 described above is formed of CFRP, and in a case in which a collision load F in a side collision of the vehicle 10 were transmitted to the roof reinforcement portion 26 without being absorbed by portions other than the roof reinforcement portion 26, the roof reinforcement portion 26 may break at an initial stage of the side collision.

The first coupling member 30 and the second coupling member 32 formed of metal are included in the present exemplary embodiment, and the roof side rails 18 and the roof reinforcement portion 26 are coupled together by the first coupling member 30 and the second coupling member 32. The first coupling member 30 is also provided with the weak section 42. As illustrated in FIG. 2, the weak section 42 deforms under a collision load F in the vehicle width direction prior to the roof reinforcement portion 26 undergoing bending deformation under the collision load F. Accordingly, collision load F in a side collision of the vehicle 10 is absorbed by the weak section 42 at an initial stage of the side collision, after which the collision load F is transmitted to the roof reinforcement portion 26 and absorbed by the roof reinforcement portion 26. Thus, the present exemplary embodiment may reduce weight of the vehicle body 12 and may secure the absorption efficiency of a collision load F in a side collision of the vehicle 10.

Moreover, in the present exemplary embodiment, the weak section 42 provided to the first coupling member 30 is formed with the bead portion 44 that extends along the vehicle front-rear direction and that protrudes toward the neutral axis L side of vehicle vertical direction bending of the first coupling member 30 under a collision load F in the vehicle width direction. Accordingly, at the location where the bead portion 44 is provided to the weak section 42, the second moment of area of the cross-section of the weak section 42 with respect to the neutral axis L is smaller than at other locations of the weak section 42, enabling the bead portion 44 to be the origin of deformation. Thus, in the present exemplary embodiment, the origin of deformation in a case in which the first coupling member 30 coupling the roof reinforcement portion 26 and the roof side rails 18 together deforms due to a collision load F in a side collision of the vehicle 10, may be set to a freely selected position.

Moreover, in the present exemplary embodiment, the weak section 42 is also formed with the bead portion 46 that extends along the vehicle front-rear direction and that is indented to the opposite side to the neutral axis L. The bead portion 46 is positioned further toward the vehicle width direction inner side than the outer side connection portion 30E connecting the first coupling member 30 and the roof side rails 18.

Thus, in a case in which the first coupling member 30 receives a collision load F in the vehicle width direction, the portion of the weak section 42 around the bead portion 44 deforms so as to form a protrusion toward the neutral axis L side, with the bead portion 44 acting as the origin. In contrast thereto, the location of the weak section 42 where the bead portion 46 is provided is less liable to undergo bending deformation, since here the second moment of area of the cross-section of the weak section 42 with respect to the neutral axis L is greater than at other locations of the weak section 42. As a result, as the deformation process of the weak section 42 progresses, the portion between the bead portion 44 and the bead portion 46 deforms so as to pivot about the bead portion 46 toward the vehicle vertical direction.

Moreover, the outer side connection portion 30E is provided at a portion to the vehicle lower side of the roof side rails 18, and the bead portions 44, 46 are disposed further toward the vehicle upper side than the outer side connection portion 30E and further toward the vehicle lower side than the apex of the roof side rail 18. Accordingly, the portion of the weak section 42 between the bead portion 44 and the bead portion 46 deforms so as to pivot toward the vehicle upper side until abutted by the extension portion 18B of the roof side rails 18. After the weak section 42 has deformed, the collision load F is transmitted from the roof side rail 18 to the roof reinforcement portion 26 through the second coupling member 32 and a portion of the first coupling member 30 further toward the vehicle width direction inner side than the bead portion 44. As a result, the load placed on the outer side connection portion 30E due to the collision load F may be suppressed. Thus, in the present exemplary embodiment, even in a state in which a collision load F has been input during a side collision of the vehicle 10, the coupled state between the roof reinforcement portion 26 and the roof side rails 18 is maintained, enabling the collision load F to be stably absorbed.

Furthermore, in the present exemplary embodiment, the high rigidity portion 48 which is set having a higher rigidity with respect to bending in the vehicle vertical direction than the rigidity of the roof reinforcement portion 26 as a result of the first coupling member 30 and the second coupling member 32, is provided between the roof reinforcement portion 26 and the weak section 42. Therefore, the certainty in which the weak section 42 will deform before the roof reinforcement portion 26 due to the bending moment resulting from a collision load F in the vehicle width direction, may be increased. Thus, in the present exemplary embodiment, the transmission of collision load F in a side collision of the vehicle 10 to the roof reinforcement portion 26 may be suppressed at an initial stage of the side collision.

Second Exemplary Embodiment

Figure 6A:
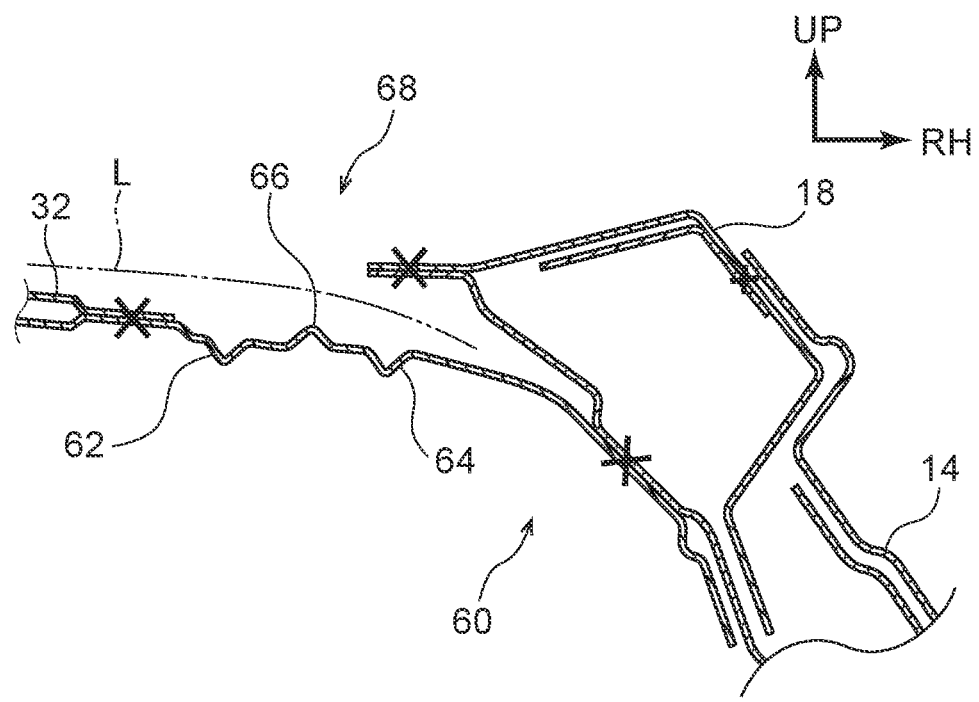
FIG. 6A is a cross-sectional view illustrating a vehicle roof structure according to a second exemplary embodiment in a state prior to a side collision of the vehicle, as viewed along a vehicle front-rear direction.
Figure 6B:
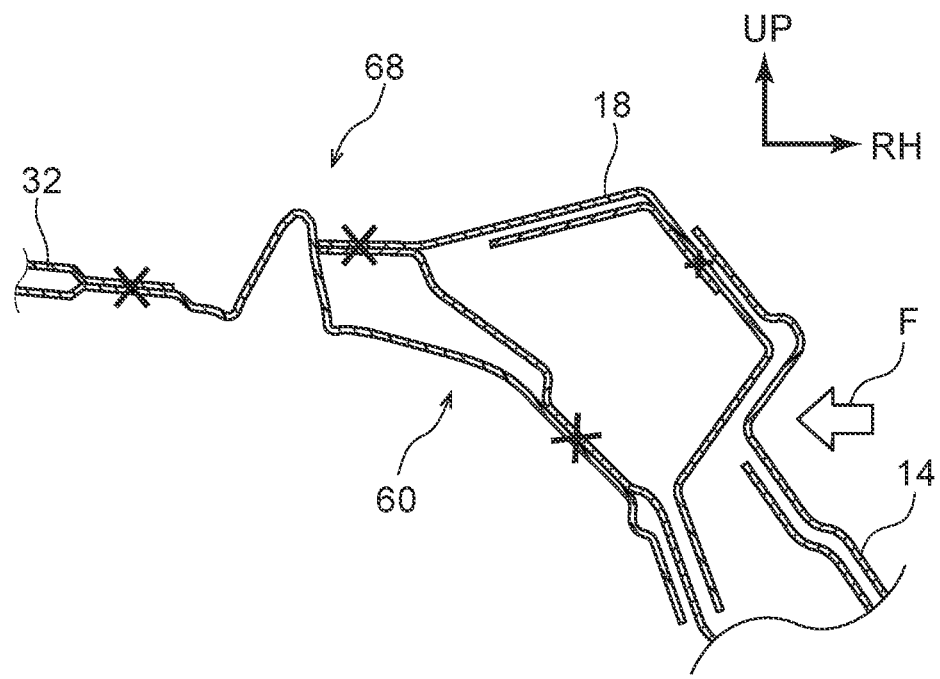
FIG. 6B is a cross-sectional view illustrating a vehicle roof structure according to the second exemplary embodiment in a state during a side collision of the vehicle, as viewed along a vehicle front-rear direction.

Explanation follows regarding a second exemplary embodiment of a vehicle roof structure according to the present disclosure, with reference to FIG. 6A and FIG. 6B. Note that components with the same configuration as in the first exemplary embodiment described above are appended with the same reference numerals, and explanation thereof is omitted.

As illustrated in FIG. 6A, the vehicle roof structure according to the present exemplary embodiment is basically configured the same as that of the first exemplary embodiment described above, but differs in the configuration of a first coupling member 60. Specifically, although the first coupling member 60 is basically configured the same as the first coupling member 30, it differs in that it is formed with a bead portion 62 serving as a first indented bead portion, a bead portion 64 serving as a second indented bead portion, and a bead portion 66 serving as a protruding bead portion.

The bead portion 62 is configured similarly to the bead portion 46, and is provided at a location of the first coupling member 60 corresponding to the location where the bead portion 44 is provided to the first coupling member 30. The bead portion 64 is also configured similarly to the bead portion 46, and is provided at a location of the first coupling member 60 corresponding to the location where the bead portion 46 is provided to the first coupling member 30. The bead portion 66 is configured similarly to the bead portion 44, and is provided between the bead portion 62 and the bead portion 64, specifically, at a location where the distance to the bead portion 62 and the distance to the bead portion 64 are the same distance. Note that in the present exemplary embodiment, a portion around the bead portions 62, 64, and 66 is set as a weak section 68.

As illustrated in FIG. 6B, with such a configuration, in a case in which the first coupling member 60 receives a collision load F in the vehicle width direction, the portion of the weak section 68 around the bead portion 66 deforms so as to form a protrusion on the neutral axis L side, with the bead portion 66 acting as the origin. In contrast thereto, the locations of the weak section 68 where the bead portions 62, 64 are provided are less liable to undergo bending deformation, since at these locations, the second moment of area of the cross-section of the weak section 68 with respect to the neutral axis L is greater than at other locations of the weak section 68. Moreover, the outer side connection portion 30E is provided to a portion at the vehicle lower side of the roof side rails 18, and the bead portions 62, 64, and 66 are disposed further toward the vehicle upper side than the outer side connection portion 30E and further toward the vehicle lower side than the apex of the roof side rail 18. Accordingly, as the deformation process of the weak section 68 progresses, the portion between the bead portion 62 and the bead portion 64 deforms so as to protrude and kink toward the vehicle upper side. Thus, in the present exemplary embodiment, the deformation amount of the weak section 68 is increased, and thus, may improve the absorption efficiency of a collision load F in a side collision of the vehicle 10.

Third Exemplary Embodiment

Explanation follows regarding a third exemplary embodiment of a vehicle roof structure according to the present disclosure, with reference to FIG. 7A and FIG. 7B. Note that components with the same configuration as in the first exemplary embodiment described above are appended with the same reference numerals, and explanation thereof is omitted.

As illustrated in FIG. 7A, the vehicle roof structure according to the present exemplary embodiment is basically configured the same as that of the first exemplary embodiment described above, but differs in that the coupling section is configured by only a coupling member 80. Specifically, the coupling member 80 is configured by a first coupling member 30 extending directly to the roof reinforcement portion 26, and is configured including an inner side connection portion 80A, an outer side connection portion 80B, and a thinned portion 80C.

The inner side connection portion 80A configures a portion to the vehicle width direction inner side of the coupling member 80, and is fastened to the roof reinforcement portion 26 by a fastening member (non-illustrated in the drawings) such as a rivet. Moreover, the outer side connection portion 80B configures a portion to the vehicle width direction outer side of the coupling member 80, and is joined to the roof side rail 18 at a joining portion 82 by spot welding or the like at the same location as the outer side connection portion 30E. The thinned portion 80C, which is thinner than the inner side connection portion 80A and the outer side connection portion 80B and which extends along the vehicle width direction, is formed between the inner side connection portion 80A and the outer side connection portion 80B. The thinned portion 80C is a portion that more readily deforms under a collision load F than the inner side connection portion 80A and the outer side connection portion 80B, and in the present exemplary embodiment, the thinned portion 80C functions as a weak section.

As illustrated in FIG. 7B, with the above described configuration, in a case in which a collision load F in the vehicle width direction is input, the thinned portion 80C undergoes bending deformation, thereby absorbing the collision load F. This enables the configuration of the weak section to be simplified compared to cases in which a bead portion or the like is provided to the coupling member 80 so as to set the weak section. Thus, in the present exemplary embodiment, the configuration of the coupling member 80 may be simplified while securing the absorption efficiency of a collision load F in a side collision of the vehicle 10.

Supplemental Explanation of Exemplary Embodiments (1) Although the first coupling member 30 and the second coupling member 32 are provided in the first exemplary embodiment described above, configuration may be made such that the roof reinforcement portion 26 and the roof side rails 18 are coupled together by a member that extends the first coupling member 30 to the roof reinforcement portion 26. This configuration may exhibit the same function as the first exemplary embodiment described above, apart from the function of the high rigidity portion 48.

(2) Although a bead portion, that is bulged so as to form a protrusion on an opposite side to the neutral axis L, is provided in the first exemplary embodiment and second exemplary embodiment described above, configuration may be made such that only a bead portion that is bulged so as to form a protrusion on the neutral axis L side is provided. This configuration may enable the configuration of the first coupling member to be simplified. Further, elongated hole portions or the like extending along the vehicle front-rear direction may be formed so as to function as the weak section instead of the bead portion.

(3) Although the coupling member that couples the roof reinforcement portion 26 and the roof side rail 18 together has a hat shaped cross-section profile in the exemplary embodiments described above, there is no limitation thereto. For example, depending on the configuration of the vehicle 10, the coupling member may take various configurations, such as a flat plate shape.

(4) Further, although the roof reinforcement portion 26 is formed of CFRP in the exemplary embodiments described above, the roof reinforcement portion 26 may be configured by a fiber reinforced plastic such as glass fiber reinforced plastic, so long as it is a material having a specific strength greater than that of iron.

What is claimed is:

1. A vehicle roof structure comprising:
    a left and right pair of roof side rails configuring part of a roof section of a vehicle body, wherein the roof side rails are supported by a center pillar configuring part of the vehicle body and extend along a vehicle front-rear direction;
    a roof reinforcement portion formed of fiber reinforced plastic, the roof reinforcement portion disposed between the roof side rails so as to extend along a vehicle width direction; and
    a left and right pair of coupling sections formed of metal, wherein each coupling section couples a corresponding one of the left and right roof side rails and the roof reinforcement portion, and includes a weak section, wherein the weak section deforms under a collision load in the vehicle width direction prior to the roof reinforcement portion undergoing bending deformation under the collision load,
    wherein the left and right pair of roof side rails each include an extension portion that extends toward the vehicle width direction inner side, and
    wherein the weak section is configured to abut the extension portion in a state in which the weak section is deformed due to the collision load,
    wherein the weak section is formed with a protruding bead portion, wherein the protruding bead portion extends along the vehicle front-rear direction and protrudes toward a side of a neutral axis of bending of each of the coupling sections in a vehicle vertical direction due to the collision load,
    wherein the weak section includes:
        the protruding bead portion formed further toward a vehicle width direction outer side than an inner side connection portion that is a connection portion of each of the coupling sections and that connects the left or right coupling section and the roof reinforcement portion, and
        an indented bead portion indented to an opposite side of the neutral axis and extending along the vehicle front-rear direction, wherein the indented bead portion is formed further toward a vehicle width direction inner side than an outer side connection portion that is another connection portion of each of the coupling sections and that connects the left or right coupling section and a corresponding one of the left or right roof side rails and further toward the vehicle width direction outer side than the protruding bead portion; and
    wherein the outer side connection portion is provided at a portion to a vehicle lower side of the roof side rails, and the protruding bead portion and the indented bead portion are disposed further toward a vehicle upper side than the outer side connection portion and further toward the vehicle lower side than an apex of the roof side rails.

2. The vehicle roof structure of claim 1, further comprising a high rigidity portion provided to each of the coupling sections and between the roof reinforcement portion and the weak section, the high rigidity portion being set with a higher rigidity with respect to bending in a vehicle vertical direction than a rigidity of the roof reinforcement portion.

3. A vehicle roof structure comprising:
    a left and right pair of roof side rails configuring part of a roof section of a vehicle body, wherein the roof side rails are supported by a center pillar configuring part of the vehicle body and extend along a vehicle front-rear direction;
    a roof reinforcement portion formed of fiber reinforced plastic, the roof reinforcement portion disposed between the roof side rails so as to extend along a vehicle width direction; and
    a left and right pair of coupling sections formed of metal, wherein each coupling section couples a corresponding one of the left and right roof side rails and the roof reinforcement portion, and includes a weak section, wherein the weak section deforms under a collision load in the vehicle width direction prior to the roof reinforcement portion undergoing bending deformation under the collision load, wherein the weak section is formed with a protruding bead portion, wherein the protruding bead portion extends along the vehicle front-rear direction and protrudes toward a side of a neutral axis of bending of each of the coupling sections in a vehicle vertical direction due to the collision load, and wherein the weak section includes:
- a first indented bead portion indented toward an opposite side to the neutral axis and extending along the vehicle front-rear direction, the first indented bead portion formed further toward a vehicle width direction outer side than an inner side connection portion that is a connection portion of each of the coupling sections and that connects the left or right coupling section and the roof reinforcement portion,
- a second indented bead portion indented to the opposite side of the neutral axis and extending along the vehicle front-rear direction, the second indented bead portion formed further toward a vehicle width direction inner side than an outer side connection portion that is another connection portion of each of the coupling sections and that connects the left or right coupling section and a corresponding one of the left or right roof side rails, and
- the protruding bead portion formed between the first indented bead portion and the second indented bead portion; and the outer side connection portion is provided at a portion at a vehicle lower side of the roof side rails, and the protruding bead portion, the first indented bead portion, and the second indented bead portion are disposed further toward a vehicle upper side than the outer side connection portion and further toward the vehicle lower side than an apex of the roof side rails.

4. A vehicle roof structure comprising:
- a left and right pair of roof side rails configuring part of a roof section of a vehicle body, wherein the roof side rails are supported by a center pillar configuring part of the vehicle body and extend along a vehicle front-rear direction;
- a roof reinforcement portion formed of fiber reinforced plastic, the roof reinforcement portion disposed between the roof side rails so as to extend along a vehicle width direction; and
- a left and right pair of coupling sections formed of metal, wherein each coupling section couples a corresponding one of the left and right roof side rails and the roof reinforcement portion, and includes a weak section, wherein the weak section deforms under a collision load in the vehicle width direction prior to the roof reinforcement portion undergoing bending deformation under the collision load, and wherein the weak section is provided between an inner side connection portion, which is a connection portion of each of the coupling sections and that connects the left or right coupling section and the roof reinforcement portion, and an outer side connection portion, which is another connection portion of each of the coupling sections and that connects the left or right coupling section and a corresponding one of the left or right roof side rails, and the weak section is configured by a thinned portion formed thinner than the inner side connection portion and the outer side connection portion.

* * * * *